(No Model.)
D. S. WILLARD & H. D. DUNBAR.
MILK PAIL.
No. 254,183. Patented Feb. 28, 1882.
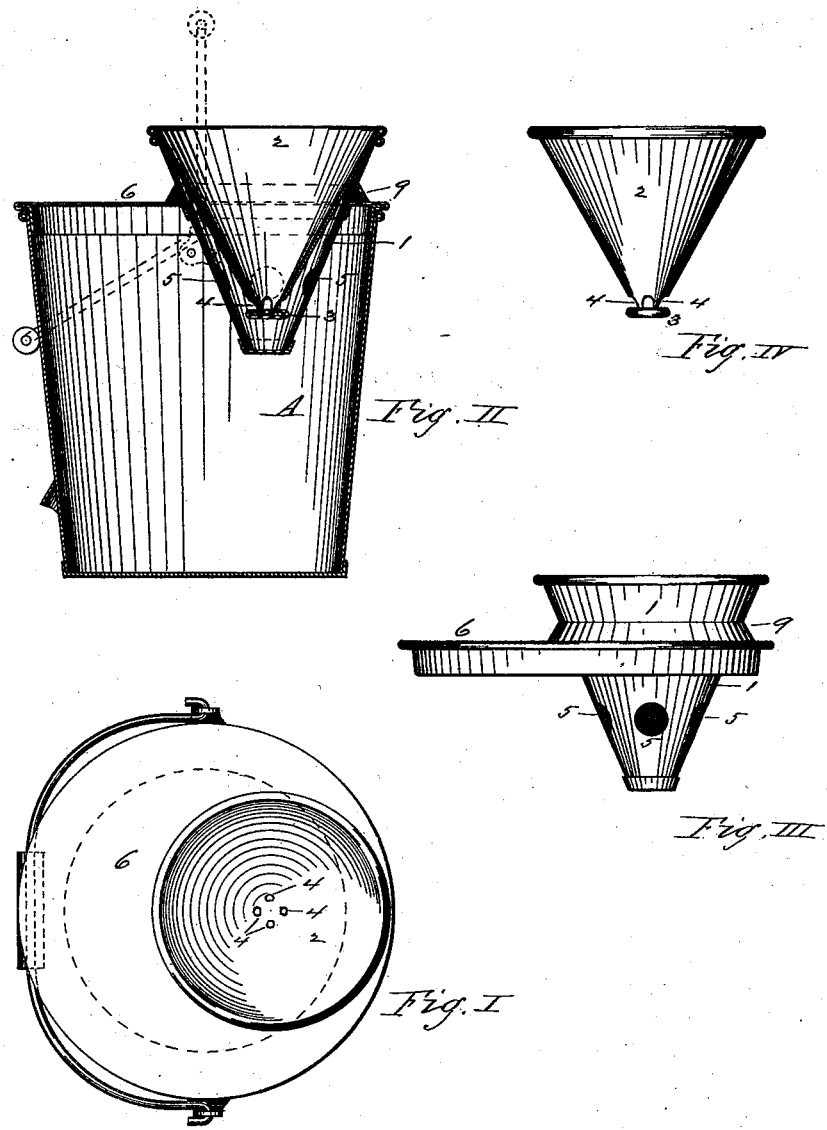
Witnesses.
E. M. Bissell.
Chas H. Wood.
Inventors.
Daniel S. Willard,
Henry D. Dunbar.
By T. A. Curtis,
their Atty.

UNITED STATES PATENT OFFICE.

DANIEL S. WILLARD AND HENRY D. DUNBAR, OF NORTH HARTLAND, VT.

MILK-PAIL.

SPECIFICATION forming part of Letters Patent No. 254,183, dated February 28, 1882.

Application filed October 19, 1881. (No model.)

*To all whom it may concern:*

Be it known that we, DANIEL S. WILLARD and HENRY D. DUNBAR, both of North Hartland, in the county of Windsor and State of Vermont, have invented a new and useful Improvement in Milk-Pails, of which the following is a specification and description.

The object of our invention is to prevent the milk, in the operation of milking, from being impregnated with dirt; and we accomplish this by the means substantially as hereinafter described, and illustrated in the accompanying drawings, in which—

Figure I is a plan view of a milk-pail made according to our invention. Fig. II is a vertical section of the same at line D. Fig. III is a side view of the cover with a single inverted cone or strainer-reservoir inserted therein, and Fig. IV is a side view of the guard cone or reservoir used in connection with the strainer-reservoir.

The essential feature of our invention is a milk-pail provided with a cover in which is placed a reservoir, preferably of the form of an inverted cone, and provided with one or more strainers. In connection with this reservoir we prefer to use a guard cone or reservoir, perforated at its lower end to allow the milk to flow out from this guard-reservoir into the strainer-reservoir, the purpose of which will be hereinafter explained.

In the drawings, A represents a pail, preferably made of tin, and of any ordinary construction, and fitted with a suitably tight cover, as 6, which has a hole therein, into which is set, so as to fit snugly, and preferably removably therefrom, a reservoir, as 1, of a cone shape and inverted, with any desired number of strainers, as 5, fixed therein at a little distance above the lower end of the reservoir, as shown clearly in Figs. II and III. Some might prefer only one of the strainers 5, while others might prefer two, three, or more. In milking, this strainer-reservoir 1 being in place, the milker milks into the lower end of the reservoir 1, and as the milk rises therein it flows over through the strainer 5 and down into the pail, leaving the dirt and sediment in the lower end of the reservoir 1. As the force of the milk in the operation of milking might have a tendency, as it strikes in the lower end of the reservoir 1, to churn or mix the dirt or sediment with the milk and cause some of the former to be carried out with the milk through the strainer into the pail, we prefer to use a guard-reservoir, as 2, which consists of a second reservoir, somewhat shorter than the strainer-reservoir, its upper end fitting the interior of the upper end of the strainer-reservoir, so that when the guard-reservoir is placed into the strainer-reservoir and resting in the upper end of the latter the lower end of the guard-reservoir 2 will be a little distance above the lower end of the strainer-reservoir 1.

The extreme lower end of the guard-reservoir 2 is stopped with any desired number of perforations, as 4, near the lower end, and when this guard-reservoir is used the milker milks into that, the milk flowing out gently into the strainer-reservoir 1 with much less disturbance of the sediment and less liability of the milk being impregnated with any taste or appearance of sediment.

The result of the use of this invention is much sweeter and more pure milk and an entire absence of the tastes of impurities, which is the usual result of the use of ordinary milk-pails in common use.

As the reservoir may be separated and lifted out of the pail, all the parts are easily washed and aired, and preserved sweet and clean, with as little trouble as in the use of any ordinary pail.

Having thus described our invention, what we claim as new is—

In an improved milk-pail, the combination, with the pail, of a cover therefor, and an inverted conical strainer-reservoir fitted into said cover and provided with a strainer at a point between its lower end and the cover, and a guard-reservoir adapted to be inserted into the strainer-reservoir and provided with side apertures near its lower end for the outflow of milk into the strainer-reservoir, substantially as set forth.

DANIEL S. WILLARD.
HENRY D. DUNBAR.

Witnesses:
JOHN J. SIMONDS,
JOS. C. ENRIGHT.